United States Patent
Pramod et al.

(10) Patent No.: US 10,676,128 B2
(45) Date of Patent: Jun. 9, 2020

(54) INVERTER COMMUTATION TECHNIQUES FOR FIVE-PHASE SYNCHRONOUS MOTOR DRIVES

(71) Applicant: STEERING SOLUTIONS IP HOLDING CORPORATION, Saginaw, MI (US)

(72) Inventors: Prerit Pramod, Saginaw, MI (US); Zhe Zhang, Saginaw, MI (US); A K M Arafat, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 16/152,970

(22) Filed: Oct. 5, 2018

(65) Prior Publication Data

US 2020/0108856 A1 Apr. 9, 2020

(51) Int. Cl.
*B62D 5/04* (2006.01)
*H02P 25/022* (2016.01)
*H02P 27/08* (2006.01)

(52) U.S. Cl.
CPC .......... *B62D 5/0463* (2013.01); *H02P 25/022* (2013.01); *H02P 27/08* (2013.01)

(58) Field of Classification Search
CPC ........ B62D 1/166; B62D 5/00; B62D 5/0409; B62D 5/093; H02P 25/022; H02P 25/064; H02P 25/024; H02P 27/08; H02P 27/00; H02P 6/00; H02P 6/26; H02P 6/32
See application file for complete search history.

(56) References Cited

U.S. PATENT DOCUMENTS

| | | | |
|---|---|---|---|
| 2002/0084764 A1* | 7/2002 | Chen | H02P 6/006 318/599 |
| 2008/0067960 A1* | 3/2008 | Maeda | B62D 5/046 318/400.02 |
| 2011/0221365 A1* | 9/2011 | Gallegos-Lopez | H02M 7/53873 318/400.02 |
| 2012/0169263 A1* | 7/2012 | Gallegos-Lopez | H02P 25/22 318/400.29 |

\* cited by examiner

*Primary Examiner* — Anne Marie Antonucci
*Assistant Examiner* — Andrew J Cromer
(74) *Attorney, Agent, or Firm* — Dickinson Wright PLLC (57) ABSTRACT

Technical solutions are described for inverter commutation techniques for five-phase synchronous motor drives. An example method for five-phase motor control of a five-phase motor in a steering system includes receiving, by a processing device, a commanded modulation index $m_i$, a phase advance angle δ, and a measured position $θ_m$. The method further includes generating, by the processing device, five duty cycles for each phase of the five-phase motor based at least in part on the commanded modulation index $m_i$, the phase advance angle δ, and the measured position $θ_m$. Each of the duty cycles includes a fundamental component and an injected harmonic component. The method further includes performing, by the processing device, a pulse width modulation technique on each of the five duty cycles to generate on-times for a plurality of switches in phase legs of an inverter.

15 Claims, 7 Drawing Sheets

INVERTER COMMUTATION TECHNIQUES FOR FIVE-PHASE SYNCHRONOUS MOTOR DRIVES

BACKGROUND

The present application is generally related to inverter commutation techniques for five-phase synchronous motor drives for electric power steering systems.

Inverter commutation techniques utilized for three-phase synchronous motor drives are well developed due to the widespread use of these machines. However, these existing inverter commutation approaches are not well developed for five-phase synchronous motor drives. These existing approaches provide low overall bus voltage utilization and introduce distortion. Accordingly, it is desirable to achieve higher bus voltage utilization and reduced distortion.

SUMMARY

According to one or more embodiments, a method for five-phase motor control includes receiving, by a processing device, a commanded modulation index $m_i$, a phase advance angle $\delta$, and a measured position $\theta_m$. The method further includes generating, by the processing device, five duty cycles for each phase of the five-phase motor based at least in part on the commanded modulation index $m_i$, the phase advance angle $\delta$, and the measured position $\theta_m$. Each of the duty cycles includes a fundamental component and an injected harmonic component. The method further includes performing, by the processing device, a pulse width modulation technique on each of the five duty cycles to generate on-times for a plurality of switches in phase legs of an inverter.

According to one or more embodiments, a five-phase motor control includes a duty cycle generator module that receives a commanded modulation index $m_i$, a phase advance angle $\delta$, and a measured position $\theta_m$ and that generates five duty cycles for each phase of the five-phase motor based at least in part on the commanded modulation index $m_i$, the phase advance angle $\delta$, and the measured position $\theta_m$. Each of the duty cycles includes a fundamental component and an injected harmonic component. The apparatus further includes a pulse width modulator that performs a pulse width modulation technique on each of the five duty cycles to generate on-times for a plurality of switches in phase legs of an inverter.

According to one or more embodiments, a steering system includes a motor that generates an amount of torque corresponding to a motor torque command. The steering system further includes a duty cycle generator module that receives a commanded modulation index $m_i$, a phase advance angle $\delta$, and a measured position $\theta_m$ and that generates five duty cycles for each phase of the five-phase motor based at least in part on the commanded modulation index $m_i$, the phase advance angle $\delta$, and the measured position $\theta_m$. Each of the duty cycles includes a fundamental component and an injected harmonic component. The steering system further includes a pulse width modulator that performs a pulse width modulation technique on each of the five duty cycles to generate on-times for a plurality of switches in phase legs of an inverter connected to the motor.

These and other advantages and features will become more apparent from the following description taken in conjunction with the drawings.

BRIEF DESCRIPTION OF THE DRAWINGS

The subject matter of the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the figures, where the present disclosure will be described with reference to specific embodiments, without limiting the same, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

Figure 1:
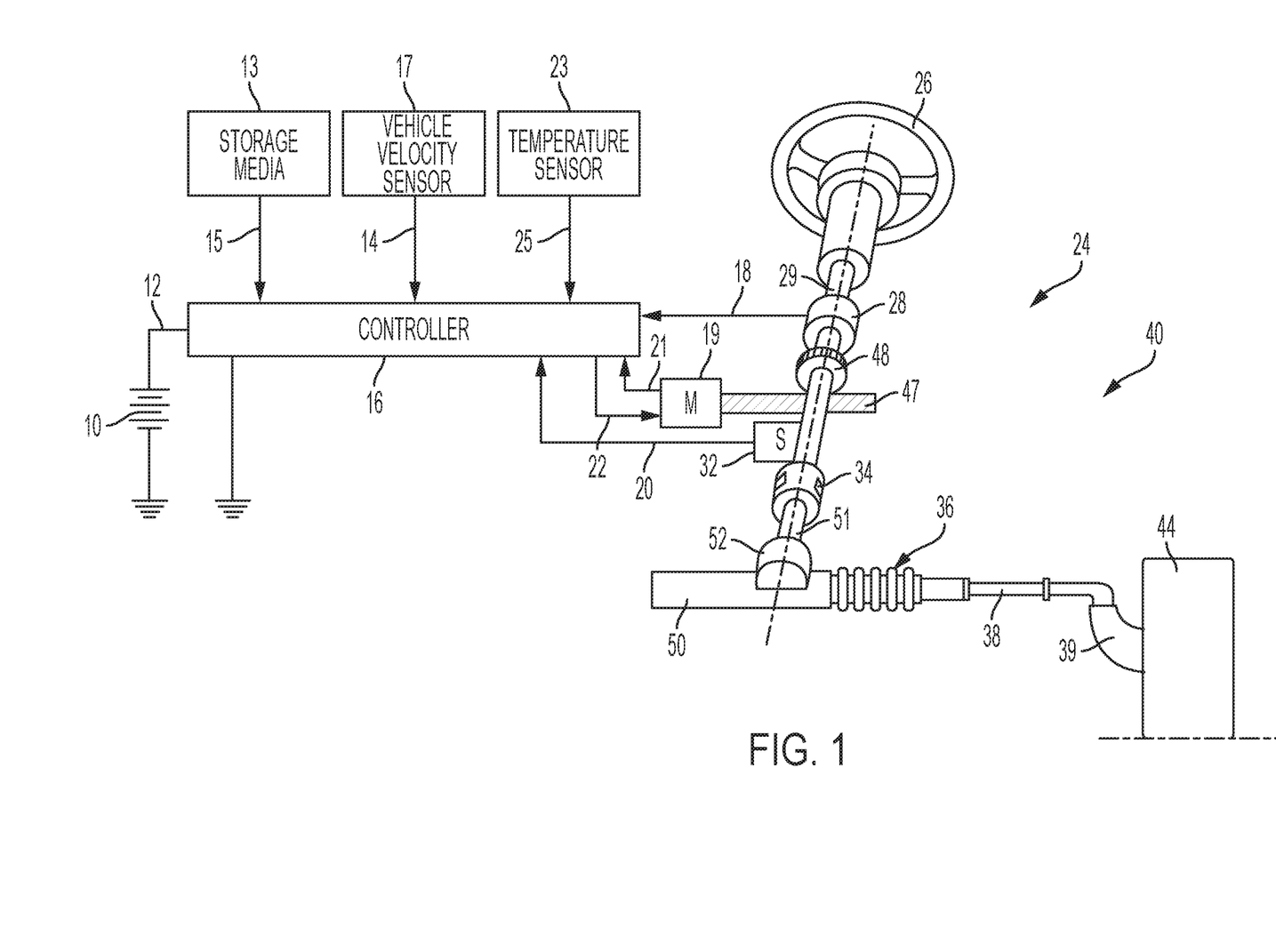
FIG. 1 depicts a block diagram of an exemplary embodiment of an electric power steering system according to aspects of the present disclosure.

Referring now to the figures, where the technical solutions will be described with reference to specific embodiments, without limiting same, FIG. 1 is an exemplary embodiment of an electric power steering system (EPS) 40 suitable for implementation of the disclosed embodiments. The steering mechanism 36 is a rack-and-pinion type system and includes a toothed rack (not shown) within housing 50 and a pinion gear (also not shown) located under gear housing 52. As the operator input, hereinafter denoted as a steering wheel 26 (e.g., a hand wheel and the like), is turned, the upper steering shaft 29 turns and the lower steering shaft 51, connected to the upper steering shaft 29 through universal joint 34, turns the pinion gear. Rotation of the pinion gear moves the rack, which moves tie rods 38 (only one shown) in turn moving the steering knuckles 39 (only one shown), which turn a steerable wheel(s) 44 (only one shown).

Electric power steering assist is provided through the control apparatus generally designated by reference numeral 24 and includes the controller 16 and an electric machine 19, which could be a permanent magnet synchronous motor (PMSM), and is hereinafter denoted as motor 19. The controller 16 is powered by the vehicle power supply 10 through line 12. The controller 16 receives a vehicle speed signal 14 representative of the vehicle velocity from a vehicle velocity sensor 17. Steering angle is measured through position sensor 32, which may be an optical encoding type sensor, variable resistance type sensor, or any other suitable type of position sensor, and supplies to the controller 16 a position signal 20. Motor velocity may be measured with a tachometer, or any other device, and transmitted to controller 16 as a motor velocity signal 21. A motor velocity denoted $\omega_m$ may be measured, calculated or a combination thereof. For example, the motor velocity $\omega_m$ may be calculated as the change of the motor position $\theta$ as measured by a position sensor 32 over a prescribed time interval. For example, motor speed $\omega_m$ may be determined as the derivative of the motor position $\theta$ from the equation $\omega_m = \Delta\theta/\Delta t$ where $\Delta t$ is the sampling time and $\Delta\theta$ is the change in position during the sampling interval. Alternatively, motor velocity may be derived from motor position as the rate of change of position with respect to time. It will be appreciated that there are numerous well-known methodologies for performing the function of a derivative.

As the steering wheel 26 is turned, torque sensor 28 senses the torque applied to the steering wheel 26 by the vehicle operator. The torque sensor 28 may include a torsion bar (not shown) and a variable resistive-type sensor (also not shown), which outputs a variable torque signal 18 to controller 16 in relation to the amount of twist on the torsion bar. Although this is one type of torque sensor, any other suitable torque-sensing device used with known signal processing techniques will suffice. In response to the various inputs, the controller sends a command 22 to the electric motor 19, which supplies torque assist to the steering system through worm 47 and worm gear 48, providing torque assist to the vehicle steering.

It should be noted that although the disclosed embodiments are described by way of reference to motor control for electric steering applications, it will be appreciated that such references are illustrative only and the disclosed embodiments may be applied to any motor control application employing an electric motor, e.g., steering, valve control, and the like. Moreover, the references and descriptions herein may apply to many forms of parameter sensors, including, but not limited to torque, position, speed and the like. It should also be noted that reference herein to electric machines including, but not limited to, motors, hereafter, for brevity and simplicity, reference will be made to motors only without limitation.

In the control system 24 as depicted, the controller 16 utilizes the torque, position, and speed, and like, to compute a command(s) to deliver the required output power. Controller 16 is disposed in communication with the various systems and sensors of the motor control system. Controller 16 receives signals from each of the system sensors, quantifies the received information, and provides an output command signal(s) in response thereto, in this instance, for example, to the motor 19. Controller 16 is configured to develop the corresponding voltage(s) out of inverter (not shown), which may optionally be incorporated with controller 16 and will be referred to herein as controller 16, such that, when applied to the motor 19, the desired torque or position is generated. In one or more examples, the controller 24 operates in a feedback control mode, as a current regulator, to generate the command 22. Alternatively, in one or more examples, the controller 24 operates in a feedforward control mode to generate the command 22. Because these voltages are related to the position and speed of the motor 19 and the desired torque, the position and/or speed of the rotor and the torque applied by an operator are determined. A position encoder is connected to the steering shaft 51 to detect the angular position $\theta$. The encoder may sense the rotary position based on optical detection, magnetic field variations, or other methodologies. Typical position sensors include potentiometers, resolvers, synchros, encoders, and the like, as well as combinations comprising at least one of the foregoing. The position encoder outputs a position signal 20 indicating the angular position of the steering shaft 51 and thereby, that of the motor 19.

Desired torque may be determined by one or more torque sensors 28 transmitting torque signals 18 indicative of an applied torque. One or more exemplary embodiments include such a torque sensor 28 and the torque signal(s) 18 therefrom, as may be responsive to a compliant torsion bar, T-bar, spring, or similar apparatus (not shown) configured to provide a response indicative of the torque applied.

In one or more examples, a temperature sensor(s) 23 located at the electric machine 19. Preferably, the temperature sensor 23 is configured to directly measure the temperature of the sensing portion of the motor 19. The temperature sensor 23 transmits a temperature signal 25 to the controller 16 to facilitate the processing prescribed herein and compensation. Typical temperature sensors include thermocouples, thermistors, thermostats, and the like, as well as combinations comprising at least one of the foregoing sensors, which when appropriately placed provide a calibratable signal proportional to the particular temperature.

The position signal 20, velocity signal 21, and a torque signal(s) 18 among others, are applied to the controller 16. The controller 16 processes all input signals to generate values corresponding to each of the signals resulting in a rotor position value, a motor speed value, and a torque value being available for the processing in the algorithms as prescribed herein. Measurement signals, such as the above mentioned are also commonly linearized, compensated, and filtered as desired to enhance the characteristics or eliminate undesirable characteristics of the acquired signal. For example, the signals may be linearized to improve processing speed, or to address a large dynamic range of the signal. In addition, frequency or time based compensation and filtering may be employed to eliminate noise or avoid undesirable spectral characteristics.

In order to perform the prescribed functions and desired processing, as well as the computations therefore (e.g., the identification of motor parameters, control algorithm(s), and the like), controller 16 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 16 may include input signal processing and filtering to enable accurate sampling and conversion or acquisitions of such signals from communications interfaces. Additional features of controller 16 and certain processes therein are thoroughly discussed at a later point herein.

The need for fault tolerance in safety-critical applications such as EPS system is ever-increasing. Dual-wound three-phase permanent magnet synchronous machines (PMSMs) are currently employed for providing fault tolerance for failures in the electrical actuator utilized in EPS systems. These machines are typically combined with two inverters and/or microcontrollers for providing complete electrical redundancy. However, when half the system fails, the total assist that may be provided is reduced to half. This may be increased only slightly by over-utilizing the remaining half system.

A potential alternative to dual-wound machines is multi-phase synchronous machines (where PMSMs fall within the broader category of synchronous machines). These machines consist of more than five phases where each phase may be controlled independently. Thus, under single-point inverter or machine failures, the total system capability is much higher than dual-wound machine based electric drive systems. However, very little work has been done for the control of power converters used with multiphase machines, and thus such machines cannot easily be employed for industrial applications. The basic sinusoidal PMW (SPWM) commutation technique, which has relatively low voltage utilization, is typically employed for multiphase drive systems presently.

According to aspects of the present disclosure, pulse width modulation (PWM) commutation techniques with injection of various harmonics for the power converter (inverter) used in five-phase PMSM based electric drive systems are described. In particular, the present disclosure describes the injection of odd order harmonics, such as third and fifth order harmonics onto the fundamental sinusoidal PWM waveforms to improve the DC bus voltage utilization. In addition, the DC bus voltage utilization upper limit is given mathematically when a single order harmonic is considered for improving the voltage output of the power converter.

Figure 2:
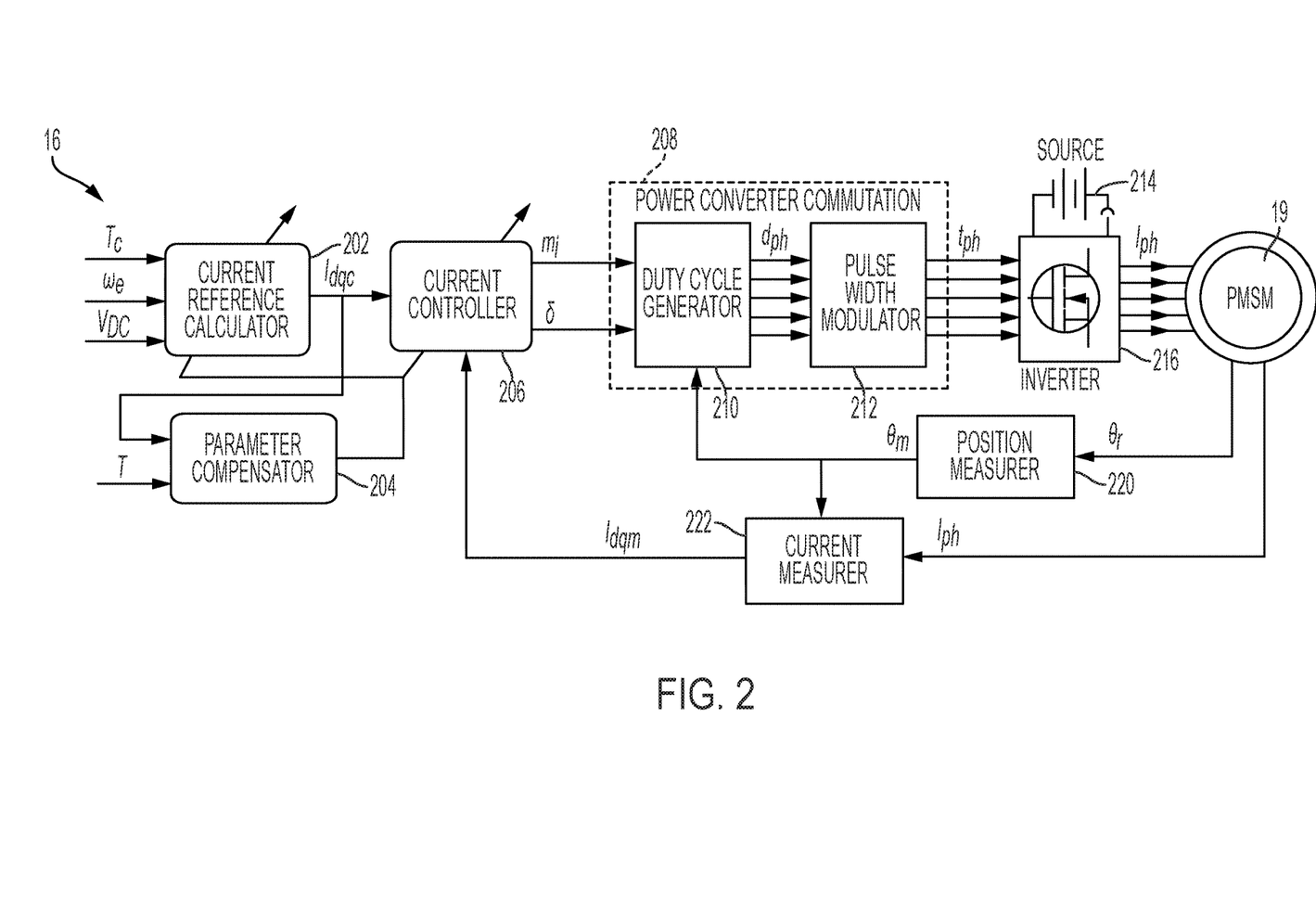
FIG. 2 depicts a block diagram of a five-phase permanent magnet synchronous motor controller according to aspects of the present disclosure.

FIG. 2 depicts a block diagram of a five-phase PMSM controller 16 according to aspects of the present disclosure. The current reference calculator 202 converts the torque command $T_c$ into d/q current references $I_{dqc}$, which are then sent to the current controller 206. The current controller 206 may be a feedback regulator utilizing current measurements or a feedforward compensator. The temperature T can be fed into a parameter compensator 204 to adjust the PMSM electrical parameters as necessary. The current controller 206 then generates the d/q voltage command, which are equivalent to a commanded modulation index $m_i$ and phase advance angle $\delta$. The $m_i$ and $\delta$ are converted to equivalent duty cycle $d_{ph}$ for each phase by the duty cycle generator 210 of the power converter commutation module 208.

Once the equivalent duty cycle $d_{ph}$ for each phase is generated, the pulse width modulator 212 then generates the on-times $t_{ph}$ for the different switches (e.g., FETs) in the phase legs of the power converter (e.g., the inverter 216). The inverter 216, powered by a source 214, then supplies the desired voltages to the motor (e.g., the PMSM 19), which produces currents $I_{ph}$ and electromagnetic torque $T_e$. The position $\theta_r$ and currents $I_{ph}$ are then measured and fed back to the position measurer 220 and the current measurer 222 respectively of the control system to close the control loop. The measured position $\theta_m$ is used with the phase currents to compute the d/q measured currents $I_{dqm}$ which are utilized for closed-loop current control. A voltage source inverter (VSI) is typically employed as the power converter in PMSM based electric drives.

While the design and structure of the actual machine are different for three phase and multiphase (greater than three phases) PMSMs, the same principle of vector control in the synchronous or d/q reference frame is possible for all these machines by using the appropriate transformation matrices for converting phase currents and voltages into the equivalent DC quantities in the synchronous frame. The present disclosure focuses on different techniques for the commutation of the power converter (e.g., the inverter 216) for a five-phase PMSM electric drive system.

Figure 3:
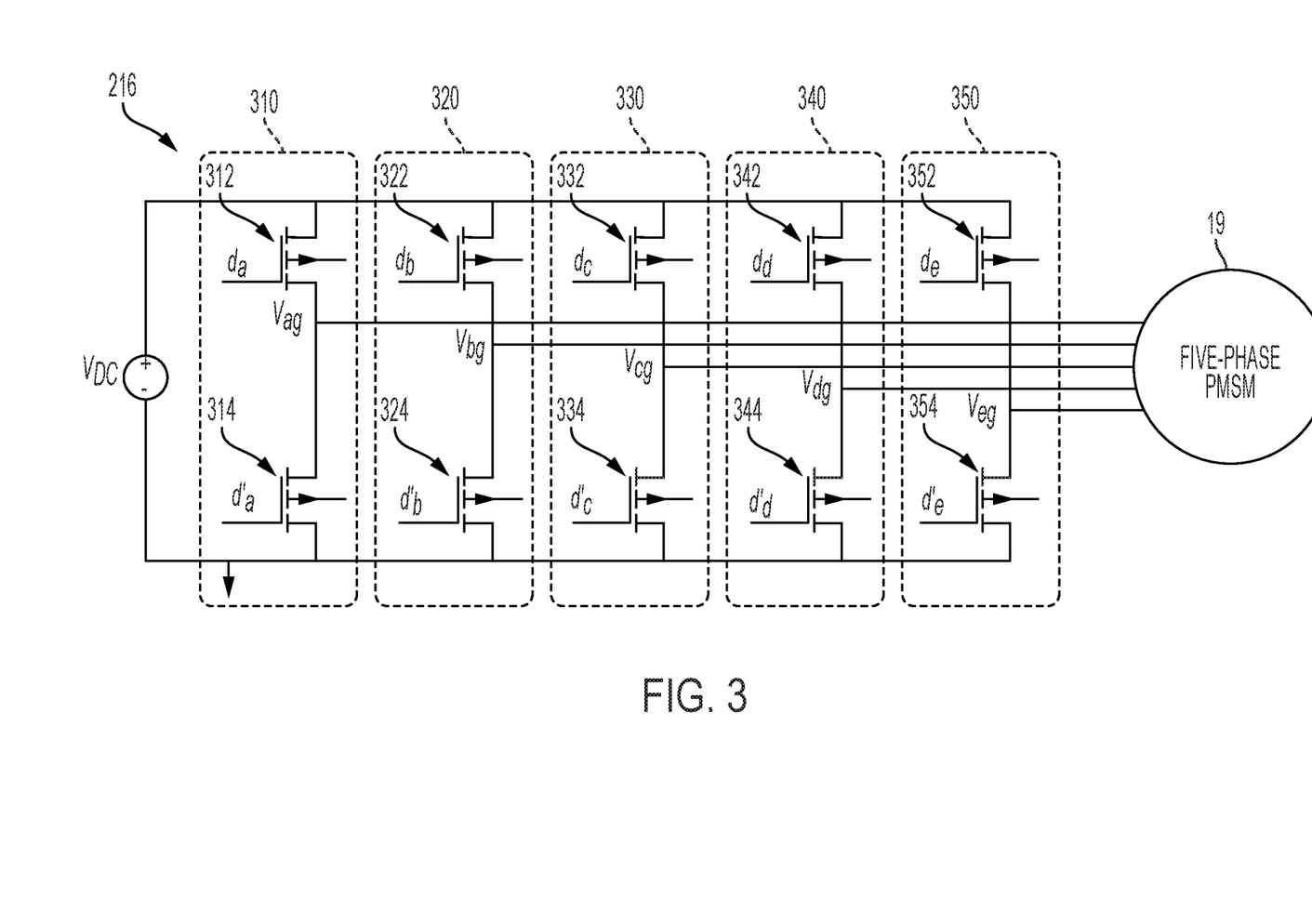
FIG. 3 depicts a block diagram of a voltage source inverter for a five-phase permanent magnet synchronous motor according to aspects of the present disclosure.

The inverter 216 for a five-phase PMSM machine is depicted in FIG. 3 according to aspects of the present disclosure. Each of the five phases of the motor (e.g., the PMSM 19) is connected to one phase leg phases that consists of two switches. For example, the inverter 216 includes five phase legs 310, 320, 330, 340, 350, each having two switches (e.g., the phase leg 310 includes switches 312, 314; the phase leg 320 includes switches 322, 324; the phase leg 330 includes switches 332, 334; the phase leg 340 includes switches 342, 344; the phase leg 350 includes switches 352, 354).

The duty cycles (equivalent to on-times) of the upper and lower switches (e.g., the switches 312, 314 represent the upper and lower switches respectively of the phase leg 310) are denoted as $d_x$ and $d_x'$ respectively, where x=a, b, c, d, e for the five phase legs. The phase to ground voltages are denoted as $V_{xg}$ (e.g., $V_{ag}$ for the phase leg 310, $V_{bg}$ for the phase leg 320, etc.). These voltages $V_{xg}$ are controlled via the duty cycles computed by the duty cycle generator 210 of FIG. 2. Typically, the sinusoidal pulse width modulation (SPWM) is the simplest way to generate sinusoidal voltage with an inverter. However, the maximum magnitude of the fundamental AC voltage output with SPWM is not optimal and can be improved by injecting various zero-sequence harmonics, such as the single or multiple odd order harmonics.

Figure 4:
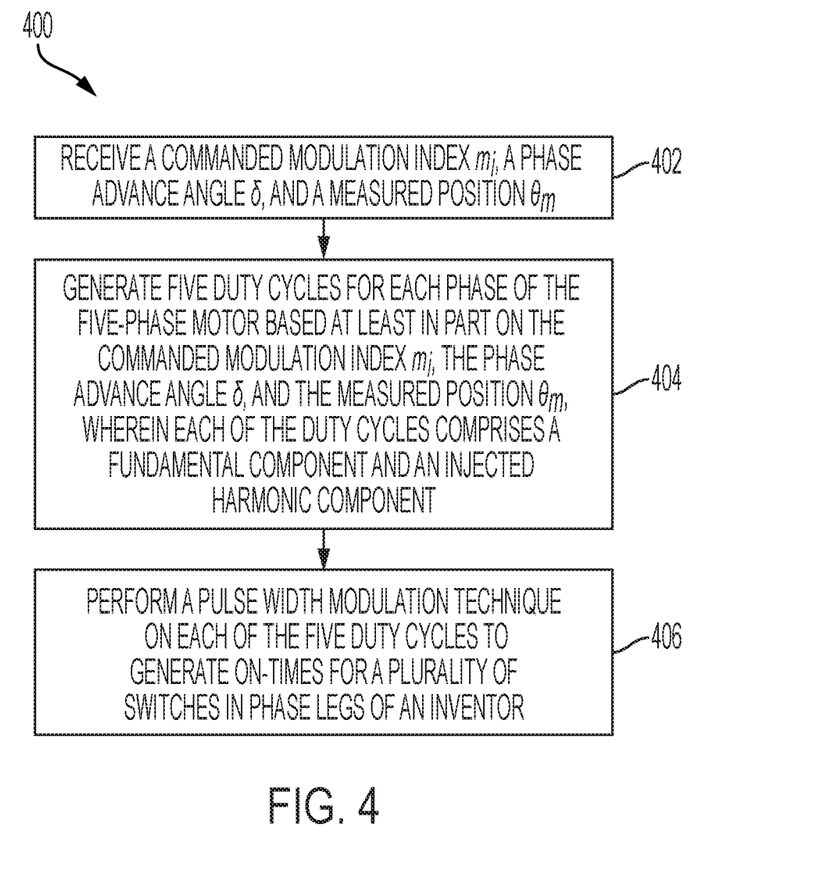
FIG. 4 depicts a flow diagram of a method for five-phase motor control in a steering system according to aspects of the present disclosure.

FIG. 4 illustrates a flow diagram of a method 400 for five-phase motor control in a steering system according to aspects of the present disclosure. The method may be implemented in an EPS system 40 as depicted in FIG. 1, for example, or in any other suitable machine or system. FIG. 4 is now described with reference to elements from FIGS. 1 and/or 2.

At block 402, a processing device, such as the duty cycle generator 210, receives a commanded modulation index $m_i$, a phase advance angle $\delta$, and a measured position $\theta_m$.

At block 404, a processing device, such as the duty cycle generator 210, generates five duty cycles for each phase of the five-phase motor based at least in part on the commanded modulation index $m_i$, the phase advance angle $\delta$, and the measured position an. Each of the duty cycles can include a fundamental component and an injected harmonic component. According to aspects of the present disclosure, the duty cycle generator 210 can inject harmonics (e.g., third harmonics, fifth harmonics, etc.) into one or more of the five duty cycles. For example, each of the duty cycles includes a fundamental component and an injected harmonic component. The injected harmonic component can be a fifth harmonic and/or a third harmonic. In some examples, the injected harmonic component is only the fifth harmonic or only the third harmonic. However, in other examples, the injected harmonic component can include bot the fifth harmonic and the third harmonic.

At block 406, a processing device, such as the pulse width modulator 212, performs a pulse width modulation technique on each of the five duty cycles to generate on-times for a plurality of switches in phase legs of an inverter.

Additional processes also may be included, and it should be understood that the process depicted in FIG. 4 represents an illustration and that other processes may be added or existing processes may be removed, modified, or rearranged without departing from the scope and spirit of the present disclosure.

Figure 5:
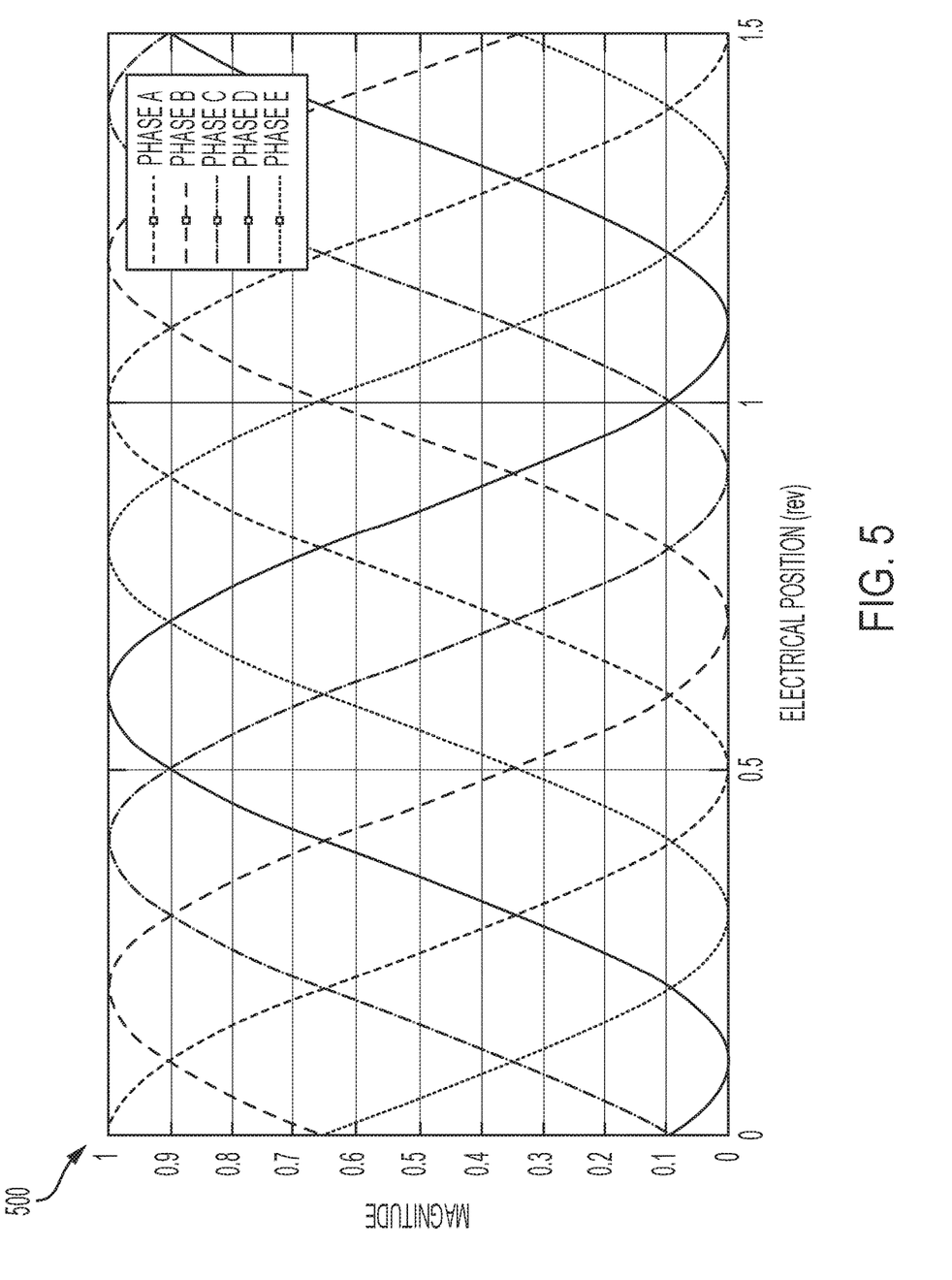
FIG. 5 depicts a graph of five-phase sinusoidal pulse width modulation duty ratio waveforms according to aspects of the present disclosure.

FIG. 5 depicts a graph 500 of five-phase SPWM duty ratio waveforms according to aspects of the present disclosure. This is the most basic technique for performing pulse width modulation by the pulse width modulator 212. In this technique, the phase voltages are separated by 360/n electrical degrees from each other, where n is the number of phases of the multiphase PMSM 19. In the case of a five-phase PMSM 19, the phase voltages are separated by 72 (e.g., 360/5) electrical degrees from each other. The duty cycles for the SPWM technique is mathematically expressed as follows:

$$d_{SPWM} = \frac{1}{2} + \frac{1}{2}m_i \cos\left(\theta_r - (\alpha - 1)\frac{2\pi}{n}\right)$$

where $\alpha=1, 2, 3 \ldots$ is the phase number and represents phases a, b, c, .... The duty ratio waveforms for the SPWM technique are shown in the graph 500 of FIG. 5.

Consider the case of injecting a single order harmonic into the sine waveform. A mathematical method of finding the optimal magnitude of the injected signal at specific frequency to achieve the maximum DC bus utilization is presented here. For simplicity, only third order harmonic is considered as an example. The rules in the derivation can be applied for higher order harmonic injection with little changes.

The mathematical expression of the modulation signals with the fundamental and third order harmonic can be described as $$d_{3rd} = \frac{1}{2} + \frac{1}{2}m_i A\cos\left(\theta_r - (\alpha - 1)\frac{2\pi}{n}\right) - \frac{1}{2}m_i AB\cos\left(3\theta_r - 3(\alpha - 1)\frac{2\pi}{n}\right)$$

To solve the coefficients A and B, the above equation can be simplified by removing the constants such as offsets and phase shifts $$d'_{3rd} = A(\cos(\theta_r) - B \cos(3\theta_r))$$

The objective of this optimization problem is to find the optimal value of B to maximize A. This can be done by taking the derivative of the above equation with respect to $\theta_r$, that is $$\frac{\partial d'_{3rd}}{\partial \theta_r} = \sin(\theta_r) - 3B\sin(3\theta_r) = 0$$

The optimal $\theta_{r\_opt}$ to achieve the maximum value of $d'_{3rd}$ can be obtained by solving the above equation $$\sin(\theta_{r\_opt}) = \sqrt{\frac{9B - 1}{12B}}$$

Substituting $\theta_{r\_opt}$ into $d'_{3rd}$ leads to $$d'_{3rd\_max} = A \times \left(B + \frac{1}{3}\right) \times \sqrt{1 + \frac{1}{3B}} = 1$$

The next step is to find the maximum value of A as a function of B. This can be done by searching for the minimum value of the function below $$f(B) = \left(B + \frac{1}{3}\right) \times \sqrt{1 + \frac{1}{3B}}$$

By taking derivative of the function $f(B)$ with respect to B, it can get $B=\frac{1}{6}$, and $A=2/\sqrt{3}$. The final expression of the modulation signal with third order harmonic injection is $$d_{3rd} = \frac{1}{2} + \frac{1}{2}m_i \frac{2}{\sqrt{3}}\left[\cos\left(\theta_r - (\alpha - 1)\frac{2\pi}{n}\right) - \frac{1}{6}\cos\left(3\theta_r - 3(\alpha - 1)\frac{2\pi}{n}\right)\right]$$

Figure 6A:
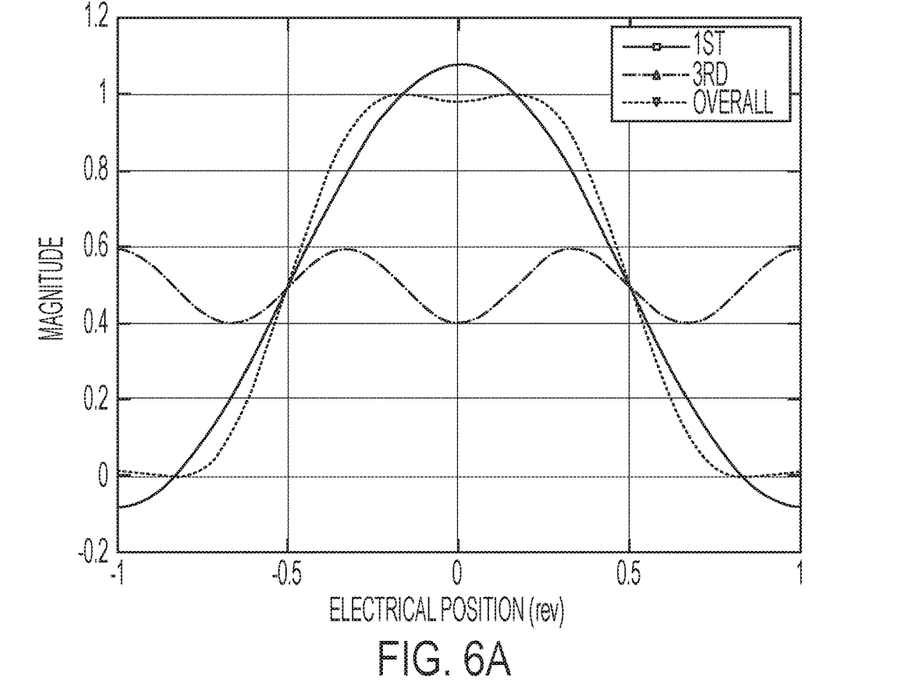
FIG. 6A depicts a graph of a waveform of the first and third harmonics according to aspects of the present disclosure.

This waveform is shown graphically in FIG. 6A. Similarly, following the above derivation processes, the modulation signal with fifth order harmonic injection can be expressed as $$d_{5th} = \frac{1}{2} +$$
$$\frac{1}{2} \cdot m_i \cdot 1.0515\left[\cos\left(\theta_r - (\alpha - 1)\frac{2\pi}{n}\right) - 0.052575 \cdot \cos\left(5\theta_r - 5(\alpha - 1)\frac{2\pi}{n}\right)\right]$$

Figure 6B:
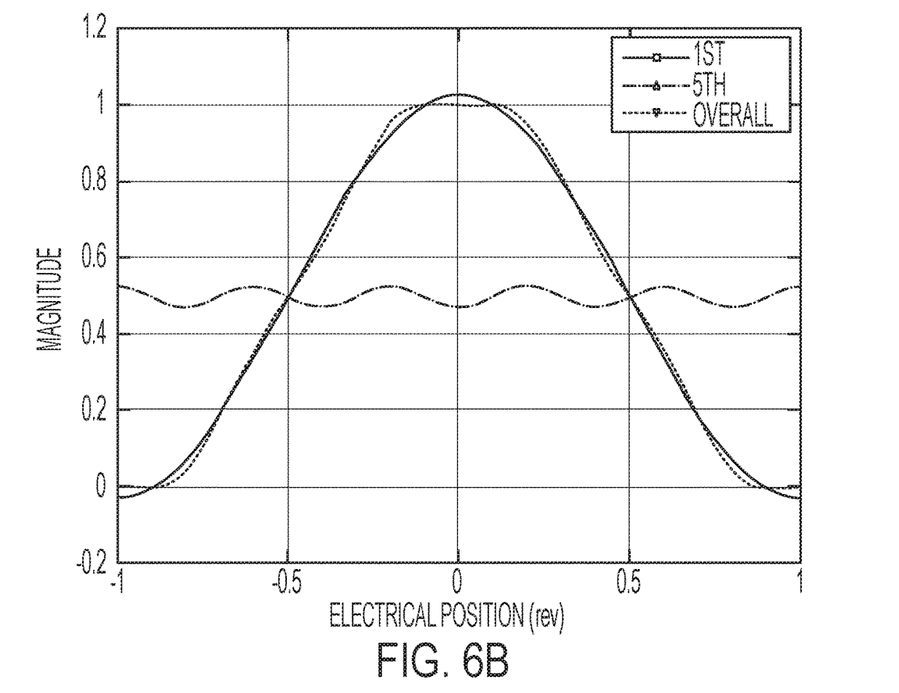
FIG. 6B depicts a graph of a waveform of the first and fifth harmonics according to aspects of the present disclosure.

It can be seen from the expressions of $d_{3rd}$ and $d_{5th}$ that the maximum fundamental output voltages increase 15.47% and 5.15%, respectively, compared to the SPWM. The general expression of the DC bus utilization for injecting nth order harmonic can be written as $1/\cos(\pi/2n)$, where n is the order of the injected harmonic. The modulation signals of $d_{3rd}$ and $d_{5th}$ with each individual order component are shown in FIGS. 5, 6A, and 6B, respectively.

For a five-phase PMSM, it is common to inject fifth order harmonic into the fundamental voltage to maximize the inverter output. This can be proved from the following derivations. The line-to-line voltage on the two adjacent phases of a five-phase PMSM, can be expressed as $$L_{ab}\frac{di_{ab}}{dt} = V_{ab\_5th} - R_{ab}i_{ab} - K_e\omega_m[\cos(\theta_r) - \cos(\theta_r - 2\pi/5)]$$

where $L_{ab}$, $R_{ab}$ and $K_e$ are the line-to-line inductance, resistance and back-EMF (BEMF) or torque constant respectively, $i_{ab}$ is the phase current and $V_{ab}$ is the actual motor input voltage. After simplification, it becomes $$L_{ab}\frac{di_{ab}}{dt} + R_{ab}i_{ab} = \left(\frac{1}{2}m_i \cdot 1.0515 \cdot V_{DC} - K_e\omega_m\right)[\cos(\theta_r) - \cos(\theta_r - 2\pi/5)]$$

It can be seen that the fifth order harmonic is cancelled out and only fundamental voltage remains. A graphical illustration of this is shown in FIG. 6B. The fundamental voltage can be further increased by applying the third order harmonic injection $d_{3rd}$ $$L_{ab}\frac{di_{ab}}{dt} = V_{ab\_3rd} - R_{ab}i_{ab} - K_e\omega_m[\cos(\theta_r) - \cos(\theta_r - 2\pi/5)]$$

$$L_{ab}\frac{di_{ab}}{dt} = \left(\frac{1}{2}m_i \cdot 1.1547 \cdot V_{DC} - K_e\omega_m\right)[\cos(\theta_r) - \cos\left[\left(\theta_r - \frac{2\pi}{5}\right)\right] - R_{ab}i_{ab} - 0.09623 \cdot m_i \cdot V_{DC}\left[\cos(3\theta_r) - \cos\left(3\theta_r - \frac{6\pi}{5}\right)\right]$$

It can be seen that the maximum inverter output voltage become 0.57735 $V_{DC}$, which is 9.8% higher than injecting fifth order harmonic only. The side effect by injecting third order harmonic into a five-phase PMSM is that it is going to excite third order current harmonic so as to produce higher order torque ripples.

Figure 7:
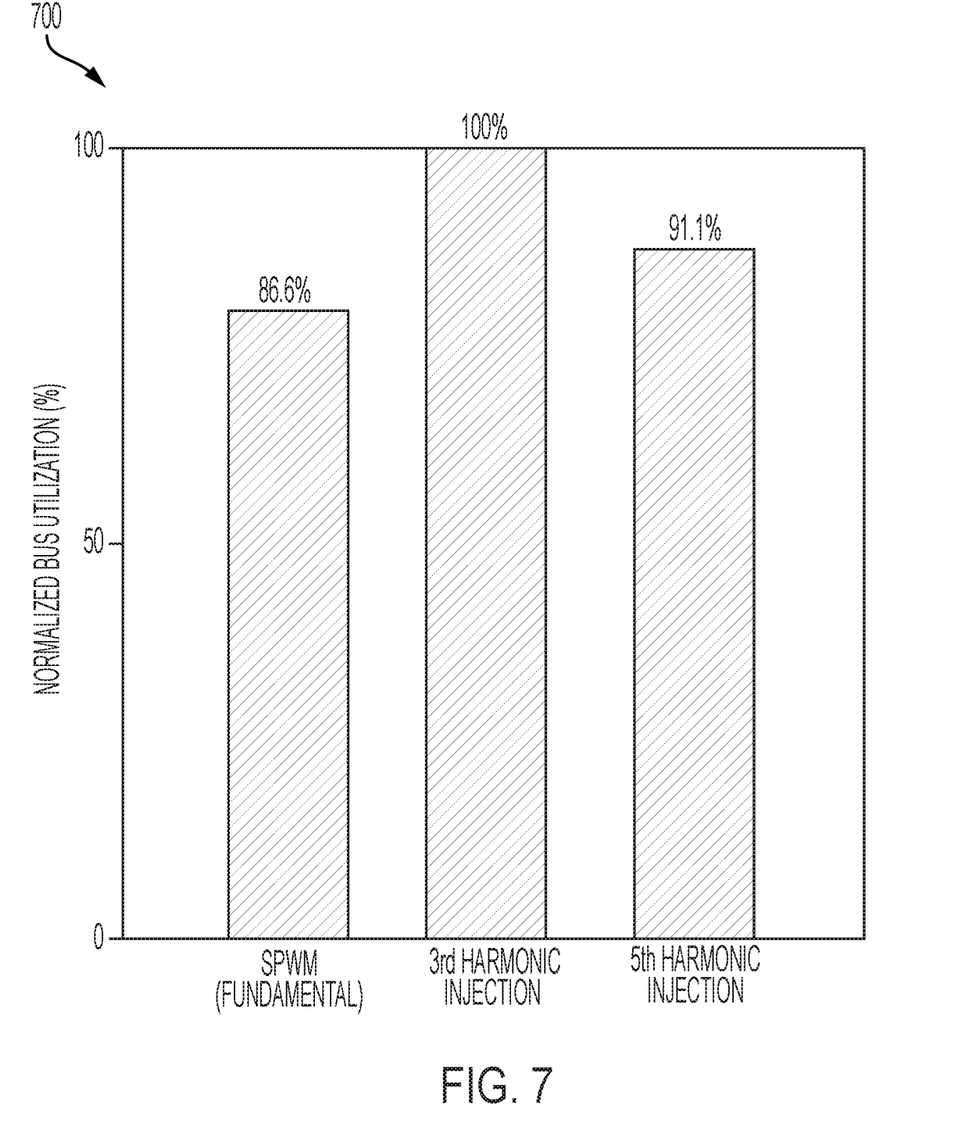
FIG. 7 depicts a graph of a comparison of bus voltage utilization for various pulse width modulation techniques according to aspects of the present disclosure.

A comparison of the normalized bus voltage utilization (considering the $3^{rd}$ harmonic injection case as the base) for the different cases described above is shown in FIG. 7.

Similar to the case of third harmonic, a general $n^{th}$ order harmonic can also be introduced into the duty cycle or PWM waveform in order to increase the bus voltage utilization, but with the negative impact of higher current harmonics and thus torque ripple.

Note that this tradeoff may be suitable depending on the specific application requirements. Embodiments of the present invention introduce the general idea of injecting specific harmonics in addition to the fundamental duty cycle or PMW waveforms in order to increase or optimally maximize the bus voltage utilization.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in scope with the present disclosure. Additionally, while various embodiments of the present disclosure have been described, it is to be understood that aspects of the present disclosure may include only some of the described embodiments or combinations of the various embodiments. Accordingly, the present disclosure is not to be seen as limited by the foregoing description.

What is claimed is:

1. A method for five-phase motor control of a five-phase motor comprising:
   receiving, by a processing device, a commanded modulation index $m_i$, a phase advance angle $\delta$, and a measured position $\theta_m$;
   generating, by the processing device, five duty cycles for each phase of the five-phase motor based at least in part on the commanded modulation index $m_i$, the phase advance angle $\delta$, and the measured position $\theta_m$, wherein each of the duty cycles comprises a fundamental component and an injected harmonic component, wherein the injected harmonic component includes at least one multiple of a first harmonic; and
   performing, by the processing device, pulse width modulation on each of the five duty cycles to generate on-times for a plurality of switches in phase legs of an inverter.

2. The method of claim 1, wherein the injected harmonic component is at least a first multiple of the fifth harmonic.

3. The method of claim 2, wherein the injected harmonic component is only the first multiple of the fifth harmonic.

4. The method of claim 2, wherein the injected harmonic comprises two injected harmonics, one of the two injected harmonics being the first multiple of the fifth harmonic.

5. The method of claim 2, wherein the injected harmonic comprises two injected harmonics, one of the two injected harmonics being the first multiple of the fifth harmonic and the other of the two injected harmonics being the third harmonic.

6. An apparatus for five-phase motor control for a five-phase motor comprising:
   a processor; and
   a memory including instructions that, when executed by the processor, cause the processor to:
     receive a commanded modulation index $m_i$, a phase advance angle $\delta$, and a measured position $\theta_m$;
     generate five duty cycles for each phase of the five-phase motor based at least in part on the commanded modulation index $m_i$, the phase advance angle $\delta$, and the measured position $\theta_m$, wherein each of the duty cycles comprises a fundamental component and an injected harmonic component, wherein the injected harmonic component includes at least one multiple of a fifth harmonic; and
     perform pulse width modulation on each of the five duty cycles to generate on-times for a plurality of switches in phase legs of an inverter.

7. The apparatus of claim 6, wherein the injected harmonic component is at least a first multiple of the fifth harmonic.

8. The apparatus of claim 7, wherein the injected harmonic component is only the first multiple of the fifth harmonic.

9. The apparatus of claim 7, wherein the injected harmonic comprises two injected harmonics, one of the two injected harmonics being the first multiple of the fifth harmonic.

10. The apparatus of claim 7, wherein the injected harmonic comprises two injected harmonics, one of the two injected harmonics being the first multiple of the fifth harmonic and the other of the two injected harmonics being the third harmonic.

11. A steering system that implements five-phase motor control for a five-phase motor in the steering system, the steering system comprising:
    a motor that generates an amount of torque corresponding to a motor torque command;
    a processor; and
    a memory including instructions that, when executed by the processor, cause the processor to:
      receive a commanded modulation index $m_i$, a phase advance angle $\delta$, and a measured position $\theta_m$;
      generate five duty cycles for each phase of the five-phase motor based at least in part on the commanded modulation index $m_i$, the phase advance angle $\delta$, and the measured position $\theta_m$, wherein each of the duty cycles comprises a fundamental component and an injected harmonic component, wherein the injected harmonic component includes at least one multiple of a fifth harmonic; and
      perform pulse width modulation on each of the five duty cycles to generate on-times for a plurality of switches in phase legs of an inverter connected to the motor.

12. The steering system of claim 11, wherein the injected harmonic component is at least a first multiple of the fifth harmonic.

13. The steering system of claim 12, wherein the injected harmonic component is only the first multiple of the fifth harmonic.

14. The steering system of claim 12, wherein the injected harmonic comprises two injected harmonics, one of the two injected harmonics being the first multiple of the fifth harmonic.

15. The steering system of claim 12, wherein the injected harmonic comprises two injected harmonics, one of the two injected harmonics being the first multiple of the fifth harmonic and the other of the two injected harmonics being the third harmonic.

\* \* \* \* \*